(12) United States Patent
Nakano

(10) Patent No.: US 12,159,997 B2
(45) Date of Patent: Dec. 3, 2024

(54) SOLID BATTERY

(71) Applicant: Murata Manufacturing Co., Ltd., Nagaokakyo (JP)

(72) Inventor: Koichi Nakano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 502 days.

(21) Appl. No.: 17/326,564

(22) Filed: May 21, 2021

(65) Prior Publication Data

US 2021/0280869 A1    Sep. 9, 2021

Related U.S. Application Data

(63) Continuation of application No. PCT/JP2019/043923, filed on Nov. 8, 2019.

(30) Foreign Application Priority Data

Nov. 29, 2018  (JP) .................. 2018-223844

(51) Int. Cl.
 H01M 4/583 (2010.01)
 H01M 4/36 (2006.01)
 (Continued)

(52) U.S. Cl.
 CPC .......... H01M 4/583 (2013.01); H01M 4/366 (2013.01); H01M 10/0525 (2013.01);
 (Continued)

(58) Field of Classification Search
 CPC .. H01M 4/583; H01M 4/366; H01M 10/0525; H01M 10/0562
 (Continued)

(56) References Cited

U.S. PATENT DOCUMENTS 10,038,193 B1 *   7/2018  Schroder ............... H01G 11/38
2008/0081257 A1 *  4/2008  Yoshida ............ H01M 10/0562
                                                    429/209

(Continued)

FOREIGN PATENT DOCUMENTS

JP   H05159812 A   6/1993
JP   H09102321 A   4/1997
 (Continued)

OTHER PUBLICATIONS

Written Opinion of the International Search Authority issued for PCT/JP2019/043923, date of mailing Jan. 28, 2020.
(Continued)

*Primary Examiner* — James M Erwin
*Assistant Examiner* — John S Medley
(74) *Attorney, Agent, or Firm* — ArentFox Schiff LLP

(57) ABSTRACT

A solid battery that includes at least one battery constituent unit including a positive electrode layer, a negative electrode layer, and a solid electrolyte layer interposed between the positive electrode layer and the negative electrode layer along a laminating direction thereof. At least one of the positive electrode layer and the negative electrode layer includes a plurality of sub-active material layers, and at least two of the plurality of sub-active material layers have active material particles with different average particle sizes from each other.

10 Claims, 7 Drawing Sheets

(51) Int. Cl.
 *H01M 10/0525* (2010.01)
 *H01M 10/0562* (2010.01)
 *H01M 4/02* (2006.01)

(52) U.S. Cl.
 CPC .. *H01M 10/0562* (2013.01); *H01M 2004/021* (2013.01); *H01M 2004/027* (2013.01); *H01M 2004/028* (2013.01)

(58) Field of Classification Search
 USPC .......................................................... 429/209
 See application file for complete search history.

(56) References Cited

U.S. PATENT DOCUMENTS

| 2011/0123866 | A1* | 5/2011 | Pan | H01M 4/525 |
| | | | | 427/458 |
| 2011/0168550 | A1* | 7/2011 | Wang | H01M 4/131 |
| | | | | 204/290.01 |
| 2012/0328942 | A1* | 12/2012 | Thomas-Alyea | H01M 4/587 |
| | | | | 429/211 |
| 2018/0076441 | A1* | 3/2018 | Bauer | H01M 4/139 |

FOREIGN PATENT DOCUMENTS

| JP | 2009181905 | A | | 8/2009 | |
| JP | 2015049991 | A | | 3/2015 | |
| JP | 2017107826 | A | | 6/2017 | |
| KR | 20170031387 | A | * | 3/2017 | ............. Y02E 60/10 |

OTHER PUBLICATIONS

International Search Report issued for PCT/JP2019/043923, date of mailing Jan. 28, 2020.

* cited by examiner

SOLID BATTERY

CROSS REFERENCE TO RELATED APPLICATIONS

The present application is a continuation of International application No. PCT/JP2019/043923, filed Nov. 8, 2019, which claims priority to Japanese Patent Application No. 2018-223844, filed Nov. 29, 2018, the entire contents of each of which are incorporated herein by reference.

FIELD OF THE INVENTION

The present invention relates to a solid battery. More specifically, the present invention relates to a laminated solid battery in which each layer constituting the battery constituent unit is laminated.

BACKGROUND OF THE INVENTION

Conventionally, a secondary battery capable of repeated charging and discharging has been used for various purposes. For example, a secondary battery may be used as a power source for electronic devices such as a smartphone and a notebook computer.

In a secondary battery, a liquid electrolyte is generally used as a medium for ion transfer that contributes to charging and discharging. That is, a so-called electrolytic solution is used in the secondary battery. However, in such a secondary battery, safety is generally required in terms of preventing leakage of the electrolytic solution. In addition, since an organic solvent used in the electrolytic solution is a flammable substance, safety is also required in that respect.

Therefore, research is being conducted on a solid battery that uses solid electrolytes instead of the electrolytic solution.

Patent Document 1: Japanese Patent Application Laid-Open No. 2009-181905
Patent Document 2: Japanese Patent Application Laid-Open No. 2015-049991

SUMMARY OF THE INVENTION

A solid battery generally includes a solid battery laminate including a positive electrode layer, a negative electrode layer, and a solid electrolyte between them (see Patent Document 1). In a solid battery, charging and discharging are performed by a reaction involving the transfer of an ion and an electron in the positive and negative electrode layers, so it is important to improve the conductivity of the ion in the positive and negative electrode layers. In that respect, a solid battery having a good ionic conduction path by using Si particles having a constant particle size as negative electrode active material particles was proposed (see Patent Document 2).

The inventor of the present application has noticed that there is still a problem to be overcome with the previously proposed solid battery as described above and has found the need to take measures against that purpose. Specifically, the inventor of the present application found that there is the following problem.

As shown in FIG. 1, when the solid battery 500 is charged, ions 10 move from a positive electrode layer 40 to a negative electrode layer 50 in a laminating direction. When the negative electrode layer 50 includes active material particles 20 having a substantially uniform particle size, the difference in ion diffusion distance from the surface layer to the inner layer can be large. Therefore, the reaction of ions 10 can be concentrated around the active material particles 20 on the surface layer of the negative electrode layer 50 on the side close to the positive electrode layer 40. As a result, the ions 10 do not move to the inner layer of the electrode layer, the reaction proceeds only on the surface layer, and the charge/discharge reaction may become non-uniform. Furthermore, when the ions are reduced and accumulated as precipitates 10' on the surface of the electrode layer, the reversibility of the charge/discharge reaction is lowered, and the battery deterioration may be increased from a long-term viewpoint. Therefore, the solid battery may not be suitable in terms of charge/discharge reaction.

The present invention has been made in view of such a problem. That is, a main object of the present invention is to provide a more suitable solid battery from the viewpoint of ionic conductivity in a charge/discharge reaction.

The inventor of the present application has attempted to solve the above problem by dealing with the problem in a new direction, instead of dealing with it as an extension of the prior art. As a result, the inventor has invented a solid battery that has achieved the above main purpose.

In the present invention, provided is a solid battery including at least one battery constituent unit including a positive electrode layer, a negative electrode layer, and a solid electrolyte layer interposed between the positive electrode layer and the negative electrode layer along a laminating direction thereof, wherein at least one of the positive electrode layer and the negative electrode layer includes a plurality of sub-active material layers, and at least two of the plurality of sub-active material layers have active material particles with different average particle sizes from each other.

The solid battery according to the present invention is a more suitable solid battery from the viewpoint of ionic conductivity in the charge/discharge reaction.

More specifically, in the solid battery of the present invention, a balance of the charge/discharge reaction of an electrode layer is improved. As a result, reaction unevenness during charging and discharging can be reduced, rate characteristics can be improved, and precipitates on the surface of the electrode layer can be reduced.

DETAILED DESCRIPTION OF THE INVENTION

Figure 1:
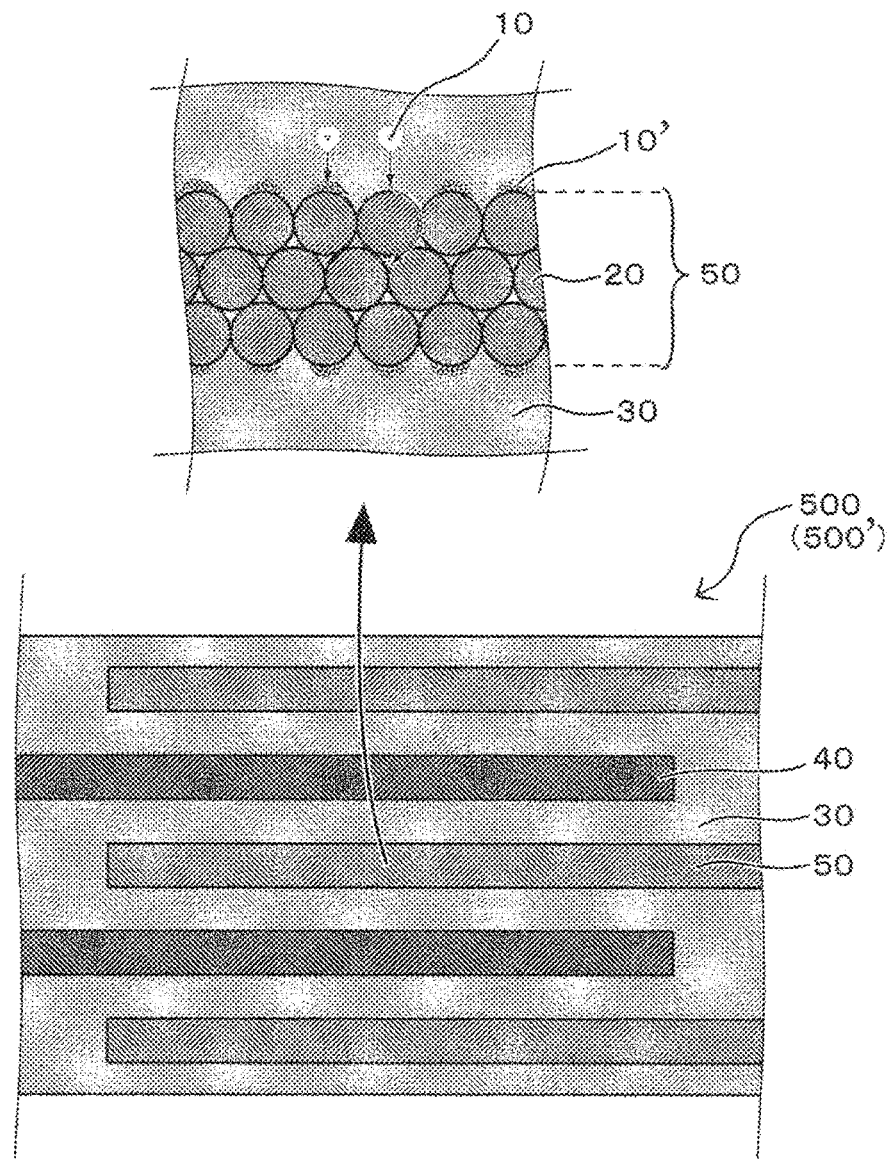
FIG. 1 is a sectional view schematically showing ionic conduction in the electrode layer in a conventional solid battery.

Hereinafter, the "solid battery" of the present invention is described in detail. Although the description is given with reference to the drawings as necessary, the contents shown are merely schematic and exemplary for the understanding of the present invention, and the appearance, dimensional ratio, and the like may differ from the real.

The "solid battery" as used in the present invention refers to a battery in which the constituent element composed of a solid in a broad sense, and an all-solid battery in which the component (especially preferably all components) is composed of a solid in a narrow sense. In one preferred aspect, the solid battery in the present invention is a laminated solid battery in which the layers forming the battery constituent unit are laminated to each other, and preferably each such layer is composed of a sintered body. The "solid battery" includes not only a so-called "secondary battery" capable of repeated charging and discharging, but also a "primary battery" capable of only discharging. In one preferred aspect of the invention, a "solid battery" is a secondary battery. The "secondary battery" is not overly adhered to its name and may also include electrochemical devices such as a power storage device.

The "planar view" as used in the present description is based on a form in which an object is viewed from above or below along a thickness direction based on a laminating direction of each layer constituting a solid battery. Furthermore, the "sectional view" as used in the present description is based on a form in which an object is viewed from a direction substantially perpendicular to a thickness direction based on a laminating direction of each layer constituting a solid battery (in short, the form when the object is cut out on a plane parallel to the thickness direction). The "vertical direction" and "horizontal direction" used directly or indirectly in the present description correspond to the up-down direction and the left-right direction in the drawings, respectively. Unless otherwise specified, the same reference numeral or symbol shall indicate the same member/part or the same meaning. In one preferred aspect, it can be considered that the vertical downward direction (that is, the direction in which gravity acts) corresponds to the "downward direction" and the opposite direction corresponds to the "upward direction."

[Basic Configuration of Solid Battery]

The solid battery includes a solid battery laminate including at least one battery constituent unit including a positive electrode layer, a negative electrode layer, and a solid electrolyte interposed between them along the laminating direction thereof.

A solid battery can be formed by firing each layer that constitutes the solid battery. That is, preferably, the positive electrode layer, the negative electrode layer, the solid electrolyte layer, and the like form a sintered layer. More preferably, each of the positive electrode layer, the negative electrode layer, and the solid electrolyte are fired integrally with each other, and therefore the battery constituent unit forms an integrally sintered body.

The positive electrode layer is an electrode layer including at least a positive electrode active material (particularly, particles of the positive electrode active material). The positive electrode layer may further include a solid electrolyte material and/or a positive electrode current collector layer. In one preferred aspect, the positive electrode layer includes a sintered body including at least positive electrode active material particles, a solid electrolyte material, and a positive electrode current collector layer. On the other hand, the negative electrode layer is an electrode layer including at least a negative electrode active material (particularly, particles of the negative electrode active material). The negative electrode layer may further include a solid electrolyte material and/or a negative electrode current collector layer. In one preferred aspect, the negative electrode layer includes a sintered body including at least negative electrode active material particles, a solid electrolyte material, and a negative electrode current collector layer.

The positive electrode active material and the negative electrode active material are substances involved in the delivery of an electron in a solid battery. Charging and discharging are performed by the transfer (conduction) of ions between the positive electrode layer and the negative electrode layer via the solid electrolyte layer and the transfer of electrons between the positive electrode layer and the negative electrode layer via an external circuit. The positive electrode layer and the negative electrode layer are particularly preferably layers that can occlude and release a lithium ion or a sodium ion. That is, it is preferable to use an all-solid secondary battery in which a lithium ion or a sodium ion transfer between the positive electrode layer and the negative electrode layer via the solid electrolyte layer to charge and discharge the battery.

(Positive Electrode Active Material)

The positive electrode active material contained in the positive electrode layer is, for example, a lithium-containing compound. The kind of the lithium compound is not particularly limited, and examples of the kind include a lithium transition metal composite oxide and/or a lithium transition metal phosphoric acid compound. The lithium transition metal composite oxide is a general term for oxides containing lithium and one kind or two or more kinds of transition metallic elements as constituent elements. The lithium transition metal phosphoric acid compound is a general term for phosphoric acid compounds containing lithium and one kind or two or more kinds of transition metallic elements as constituent elements. The kind of transition metallic element is not particularly limited, and examples of the kind include cobalt (Co), nickel (Ni), manganese (Mn), and/or iron (Fe).

Examples of the lithium transition metal composite oxide include a compound represented by $Li_xM1O_2$ and $Li_yM2O_4$, respectively. Examples of the lithium transition metal phosphoric acid compound include a compound represented by $Li_zM3PO_4$. Each of M1, M2, and M3 is one kind or two or more kinds of transition metallic elements. The respective values of x, y, and z are optional.

Specifically, examples of the lithium transition metal composite oxide include $LiCoO_2$, $LiNiO_2$, $LiVO_2$, $LiCrO_2$, and/or $LiMn_2O_4$. Furthermore, examples of the lithium transition metal phosphoric acid compound include $LiFePO_4$ and/or $LiCoPO_4$.

Furthermore, examples of the positive electrode active material that can occlude and release a sodium ion include at least one kind selected from the group consisting of a sodium-containing phosphoric acid compound having a NASICON-type structure, a sodium-containing phosphoric acid compound having an olivine-type structure, a sodium-containing layered oxide, and a sodium-containing material having a spinel-type structure.

(Negative Electrode Active Material)

Examples of the negative electrode active material contained in the negative electrode layer include a carbon material, a metallic material, a lithium alloy and/or a lithium-containing compound.

Specifically, examples of the carbon material include graphite, easily graphitizable carbon, hardly graphitizable carbon, a meso-carbon microbead (MCMB), and/or highly oriented graphite (HOPG).

A metallic material is a general term for materials containing one kind or two or more kinds of metallic elements and semi-metallic elements capable of forming an alloy with lithium as constituent elements. The metallic material may be a simple substance, an alloy, or a compound. Since the purity of the simple substance described here is not necessarily limited to 100%, the simple substance may contain a trace amount of an impurity.

Examples of the metallic element and semi-metallic element include silicon (Si), tin (Sn), aluminum (Al), indium (In), magnesium (Mg), boron (B), gallium (Ga), germanium (Ge), lead (Pb), bismuth (Bi), cadmium (Cd), titanium (Ti), chromium (Cr), iron (Fe), niobium (Nb), molybdenum (Mo), silver (Ag), zinc (Zn), hafnium (Hf), zirconium (Zr), yttrium (Y), palladium (Pd), and/or platinum (Pt).

Specifically, examples of the metallic material include Si, Sn, $SiB_4$, $TiSi_2$, SiC, $Si_3N_4$, $SiO_V$ ($0<v\leq2$), LiSiO, $SnO_w$ ($0<w\leq2$), $SnSiO_3$, LiSnO, and/or, $Mg_2Sn$.

Examples of the lithium-containing compound include a lithium transition metal composite oxide. The definition of the lithium transition metal composite oxide is as described above. Specifically, examples of the lithium transition metal double oxide include $Li_3V_2(PO_4)_3$, $Li_3Fe_2(PO_4)_3$, and/or $Li_4Ti_5O_{12}$.

Examples of the negative electrode active material that can occlude and release a sodium ion include at least one kind selected from the group consisting of a sodium-containing phosphoric acid compound having a NASICON-type structure, a sodium-containing phosphoric acid compound having an olivine-type structure, and a sodium-containing material having a spinel-type structure.

The positive electrode layer and/or the negative electrode layer may contain an electron conductive material. Examples of the electron conductive material contained in the positive electrode layer and/or the negative electrode layer include a carbon material and/or a metal material. Specifically, examples of the carbon material include graphite and/or a carbon nanotube. Examples of the metal material include copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and/or palladium (Pd), and an alloy of two or more of them.

Furthermore, the positive electrode layer and/or the negative electrode layer may contain a binder. Examples of the binder include any one kind or two or more kinds of synthetic rubber and a polymer material. Specifically, examples of the synthetic rubber include a styrene-butadiene rubber, a fluorine-based rubber and/or an ethylene propylene diene. Examples of the polymer material include at least one kind selected from the group consisting of a polyvinylidene fluoride, a polyimide, and an acrylic resin.

Furthermore, the positive electrode layer and/or the negative electrode layer may contain a sintering aid. Examples of the sintering aid, at least one kind selected from the group consisting of a lithium oxide, a sodium oxide, a potassium oxide, a boron oxide, a silicon oxide, a bismuth oxide, and a phosphorus oxide.

The thicknesses of the positive electrode layer and the negative electrode layer are not particularly limited and may be, for example, independently 2 μm to 50 μm, particularly 5 μm to 30 μm.

(Solid Electrolyte)

The solid electrolyte is a material capable of conducting a lithium ion or a sodium ion. In particular, the solid electrolyte that forms the battery constituent unit of a solid battery forms a layer in which a lithium ion can be conducted between the positive electrode layer and the negative electrode layer. The solid electrolyte may be provided at least between the positive electrode layer and the negative electrode layer. That is, the solid electrolyte may also be present around the positive electrode layer and/or the negative electrode layer so as to protrude from between the positive electrode layer and the negative electrode layer. Examples of the specific solid electrolyte include any one kind or two or more kinds of a crystalline solid electrolyte and a glass-ceramic solid electrolyte.

The crystalline solid electrolyte is a crystalline electrolyte. Specifically, examples of the crystalline solid electrolyte include an inorganic material and/or a polymer material. Examples of such inorganic material include a sulfide and an oxide. Examples of the sulfide include $Li_2S$—$P_2S_5$, $Li_2S$—$SiS_2$—$Li_3PO_4$, $Li_7P_3S_{11}$, $Li_{3.25}Ge_{0.25}P_{0.75}S$, and $Li_{10}GeP_2S_{12}$. Examples of the oxide include $Li_xM_y(PO_4)_3$ ($1\leq x\leq 2$, $1\leq y\leq 2$, M is at least one kind selected from the group consisting of Ti, Ge, Al, Ga, and Zr), $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$, $L_{1.2}Al_{0.2}T_{1.8}(PO_4)_3$, $La_{0.55}Li_{0.35}TiO_3$, and/or $Li_7La_3Zr_2O_{12}$. Examples of the polymeric material include a polyethylene oxide (PEO).

The glass-ceramic solid electrolyte is an electrolyte in which amorphous and crystalline are mixed. The glass-ceramic solid electrolyte contains, for example, an oxide containing lithium (Li), silicon (Si), and/or boron (B) as a constituent element, and more specifically, lithium oxide ($Li_2O$), silicon oxide ($SiO_2$), and/or boron oxide ($B_2O_3$). The ratio of the content of a lithium oxide to the total content of a lithium oxide, a silicon oxide, and a boron oxide is not particularly limited, and is, for example, 40 mol % to 73 mol %. The ratio of the content of a silicon oxide to the total content of a lithium oxide, a silicon oxide, and a boron oxide is not particularly limited, and is, for example, 8 mol % to 40 mol %. The ratio of the content of a boron oxide to the total content of a lithium oxide, a silicon oxide, and a boron oxide is not particularly limited, and is, for example, 10 mol % to 50 mol %. In order to measure the respective contents of a lithium oxide, a silicon oxide, and a boron oxide, the glass-ceramic solid electrolyte is analyzed, for example, using inductively coupled plasma emission spectroscopy (ICP-AES).

Examples of the solid electrolyte in which a sodium ion can be conducted include a sodium-containing phosphoric acid compound having a NASICON structure, an oxide having a perovskite structure, and an oxide having a garnet type or a garnet-like type structure. Examples of the sodium-containing phosphoric acid compound having a NASICON structure, $Na_xM_y(PO_4)_3$ (1≤x≤2, 1≤y≤2, M is at least one kind selected from the group consisting of Ti, Ge, Al, Ga, and Zr).

The solid electrolyte layer may contain a binder and/or a sintering aid. The binder and/or sintering aid contained in the solid electrolyte layer may be selected from, for example, materials similar to the binder and/or sintering aid that may be contained in the positive electrode layer and/or the negative electrode layer.

The thickness of the solid electrolyte layer is not particularly limited, and may be, for example, 1 μm to 15 μm, particularly 1 μm to 5 μm.

(Positive Electrode Current Collector Layer/Negative Electrode Current Collector Layer)

As the positive electrode current collector material constituting the positive electrode current collector layer and the negative electrode current collector material constituting the negative electrode current collector layer, it is preferable to use a material having a large conductance. For example, as each of the positive electrode current collector material and the negative electrode current collector material, it is preferable to use at least one kind selected from the group consisting of silver, palladium, gold, platinum, aluminum, copper, and nickel. Each of the positive electrode current collector layer and the negative electrode current collector layer has an electrical connection part for electrically connecting to the outside and may be connectable to a terminal. Each of the positive electrode current collector layer and the negative electrode current collector layer may have a foil form, but from the viewpoint of improving electron conductivity and reducing manufacturing costs by integral sintering, it is preferable to have an integral sintering form. When the positive electrode current collector layer and the negative electrode current collector layer have the form of a sintered body, each of them may be composed of, for example, a sintered body containing an electron conductive material, a binder, and/or a sintering aid. The electron conductive material contained in each of the positive electrode current collector layer and the negative electrode current collector layer may be selected from, for example, materials similar to the electron conductive materials that can be contained in the positive electrode layer and/or the negative electrode layer. The binder and/or sintering aid contained in each of the positive electrode current collector layer and the negative electrode current collector layer may be selected from, for example, materials similar to the binder and/or the sintering aid that may be contained in the positive electrode layer and/or the negative electrode layer.

The thickness of each of the positive electrode current collector layer and the negative electrode current collector layer is not particularly limited. For example, the thickness of each of the positive electrode current collector layer and the negative electrode current collector layer may be 1 μm to 10 μm.

(Insulating Layer)

The insulating layer refers to a material that does not conduct electricity in a broad sense, that is, a layer composed of a non-conductive material, and a material composed of an insulating material in a narrow sense. Although not particularly limited, the insulating layer may be composed of, for example, a glass material and/or a ceramic material. As the insulating layer, for example, a glass material may be selected. The glass material is not particularly limited, but example of the glass material include at least one kind selected from the group consisting of a soda-lime glass, a potash glass, a borate-based glass, a borosilicate-based glass, a barium borate-based glass, a zinc borate-based glass, a barium borate-based glass, a bismuth borosilicate-based glass, a bismuth-zinc borate-based glass, a bismuth silicate-based glass, a phosphate-based glass, an aluminophosphate-based glass, and a zinc phosphate-based glass. The ceramic material is not particularly limited, and the example of the ceramic material include at least one kind selected from the group consisting of aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), and barium titanate ($BaTiO_3$).

(Electrode Separation Part)

The electrode separation part is disposed around the positive electrode layer to separate the positive electrode layer from the negative electrode terminal. Furthermore/alternatively, the electrode separation part is disposed around the negative electrode layer to separate the negative electrode layer from the positive electrode terminal. The electrode separation part is not particularly limited, but it preferably includes, for example, a solid electrolyte, and an insulating material.

(Protective Layer)

The protective layer can generally be formed on the outermost side of the solid battery and is for electrical, physical, and/or chemical protection. As a material constituting the protective layer, it is preferable that the material has excellent insulation properties, durability, and/or moisture resistance and is environmentally safe. For example, it is preferable to use glass, a ceramic, a thermosetting resin, and/or a photocurable resin.

(Terminal)

The solid battery is generally provided with a terminal (for example, an external terminal). In particular, positive and negative electrode terminals are provided on the side face of the solid battery so as to form a pair. More specifically, the terminal on the positive electrode side connected to the positive electrode layer and the terminal on the negative electrode side connected to the negative electrode layer may be provided so as to form a pair. For such terminals, it is preferable to use a material having a large conductance. The material of the terminal is not particularly limited and may be at least one kind selected from the group consisting of silver, gold, platinum, aluminum, copper, tin, and nickel.

[Features of Solid Battery of the Present Invention]

The solid battery of the present invention is a solid battery including at least one battery constituent unit including a positive electrode layer, a negative electrode layer, and a solid electrolyte layer interposed between the positive electrode layer and the negative electrode layer along a laminating direction thereof, and the composition of the active material layer in the positive electrode layer and the negative electrode layer is such that at least one of the positive or negative electrode layers includes a plurality of sub-active material layers.

More specifically, in the solid battery, at least one of the positive or negative electrode layers has a different particle size layer that includes a plurality of sub-active material layers having different average particle sizes among the active material particles. The number of sub-active material layers in the different particle size layer is at least two. Preferably, the number of layers of the sub-active material in the single different particle size layer is three or more.

The "average particle size" as used in the present invention refers to the arithmetic mean diameter of a plurality of active material particles in each sub-active material layer. For example, from the sectional SEM image of each sub-active material layer, the maximum diameter length of each of the 10 or more active material particles in each layer is obtained as the particle size, and the value obtained by arithmetically averaging the particle sizes of the 10 or more active material particles may be defined as the "average particle size".

The "sub-active material layer" as used in the present description refers to a layer that is included in the active material layer when the positive or negative electrode layer is viewed as, for example, a single active material layer, and is an element that constitutes the active material layer.

When the solid battery of the present invention is charged and discharged, at least one of the positive or negative electrode layers has a different particle size layer, so that the difference in ion diffusion distance from the surface layer to the inner layer of the electrode layer can be substantially reduced. As a result, the reaction concentration on the surface layer of the electrode layer can be relaxed, and the accumulation of precipitates caused by the reduction of an ion can be reduced. That is, a more desirable solid battery can be obtained by improving the balance of charge/discharge reactions in the laminating direction. Therefore, reaction unevenness during charging and discharging can be reduced, rate characteristics can be improved, and precipitates on the surface of the electrode layer can be reduced. In other words, battery deterioration is suppressed from a long-term perspective due to such desired charging and discharging, and as a result, a solid battery with improved long-term reliability can be obtained.

Figure 3:
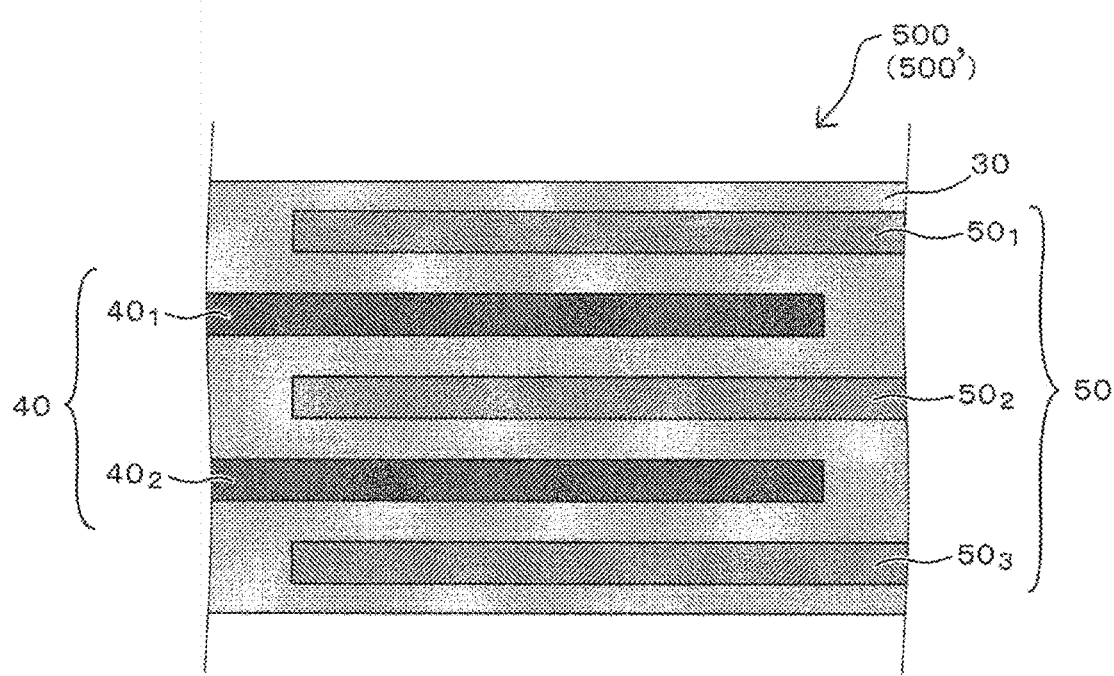
FIG. 3 is a sectional view schematically showing a solid battery according to an embodiment of the present invention.

In the exemplary aspect shown in FIG. 3, the positive electrode layer 40, a solid electrolyte layer 30, and the negative electrode layer 50 are provided in this order in the sectional view of the solid battery 500. To put it simply, the solid electrolyte layer 30 is interposed between the positive electrode layer 40 and the negative electrode layer 50. In such a solid battery 500, at least one of the positive electrode layer 40 and the negative electrode layer 50 has a different particle size layer including a plurality of sub-active material layers having different average particle sizes among the active material particles.

Figure 4:
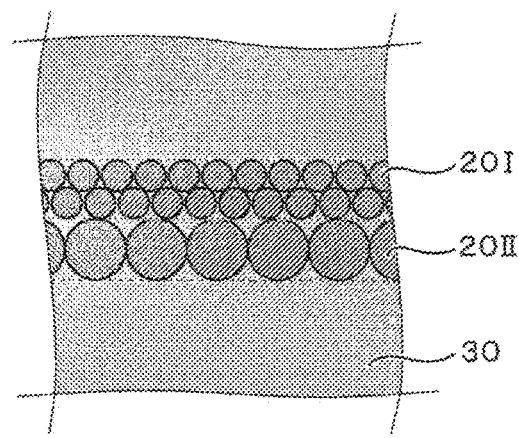
FIG. 4 is a sectional view schematically showing a different particle size layer including two sub-active material layers in a solid battery according to an embodiment of the present invention.

In one preferred aspect, for example, when negative electrode layers $50_1$ and $50_3$ in which different electrode layers are present on only one opposite side in the laminating direction, such electrode layers include two sub-active material layers having different average particle sizes (that is, a layer including active material particles 20I having a relatively small average particle size and a layer including active material particles 20II having a relatively large average particle size) as shown in FIG. 4. In this case, sub-active material layers including active material particles 20I having a relatively small average particle size in the negative electrode layers $50_1$ and $50_3$ are provided on the positive electrode layers $40_1$ and $40_2$ sides facing each other in the laminating direction, respectively. The negative electrode layers $50_1$ and $50_3$ in which the different electrode layers are present only on one opposite side in the laminating direction can correspond to the outermost layer in, for example, a solid battery laminate. That is, in the negative electrode layer corresponding to such an outermost layer, the sub-active material layer of the active material particles 20I having a relatively small average particle size is disposed relatively proximal to the directly opposed positive electrode layer.

Figure 5:
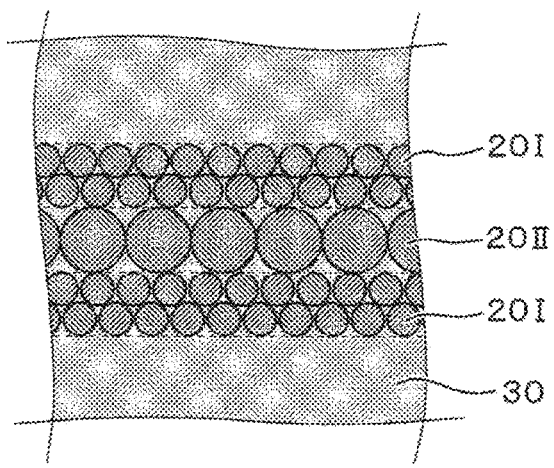
FIG. 5 is a sectional view schematically showing a different particle size layer in which a sub-active material layer having a large particle size is interposed between sub-active material layers having a small particle size in a solid battery according to an embodiment of the present invention.

In another preferred aspect, for example, when positive electrode layers $40_1$ and $40_2$ and negative electrode layers $50_2$ in which different electrode layers are present on both opposite sides thereof in the laminating direction, as shown in FIG. 5, such electrode layers include three sub-active material layers and have a structure in which a sub-active material layer including active material particles 20II having a relatively large average particle size interposed between two sub-active material layers including active material particles 20I with a relatively small average particle size in the laminating direction. The positive electrode layers $40_1$ and $40_2$ and the negative electrode layer $50_2$ in which different electrode layers are present on both opposite sides thereof in the laminating direction can correspond to, for example, an inner layer other than the outermost layer in the solid battery laminate.

Figure 2:
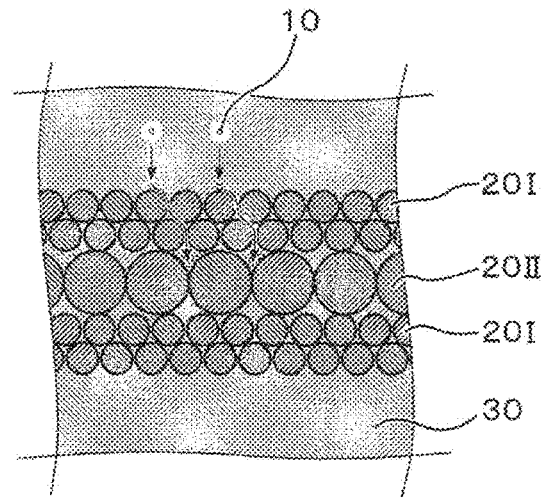
FIG. 2 is a sectional view schematically showing ionic conduction in the electrode layer in a solid battery according to an embodiment of the present invention.

Although not bound by a specific theory, in a different particle size layer, when a sub-active material layer including active material particles having a relatively small average particle size on the side where the different electrode layers facing each other in the laminating direction exist is provided, the gaps between the active material particles can be increased on the surface layer of the different particle size layer, and the diffusion distance of ions can be reduced (see FIG. 2). This is because the number of curved paths through which the ion can pass increases in such a surface layer, and the ion can be conducted more linearly. As a result, the difference in the substantial ion diffusion distance from the surface layer to the inner layer of the electrode layer can be reduced, and the balance of the charge/discharge reaction in the laminating direction of the electrode layer can be improved more effectively.

Furthermore, the present invention is not limited to the different particle size layer having the above structure, and it can be applied to any different particle size layer including a plurality of sub-active material layers having different average particle sizes among the active material particles. For example, it can also be applied to a different particle size layer in which a sub-active material layer including active material particles having a relatively large average particle size is provided on a side where different electrode layers face each other in the laminating direction according to the reaction rate of the active material particles used for each sub-active material layer. In one preferred aspect, the different particle size layers of the sub-active material layer have the same thickness. In another aspect, the different particle size layers of the sub-active material layer have different thicknesses from each other. Furthermore, in another preferred aspect, at least one electrode layer (that is, a single electrode layer) of the positive electrode layer or the negative electrode layer is substantially composed of different particle size layers.

Figure 6:
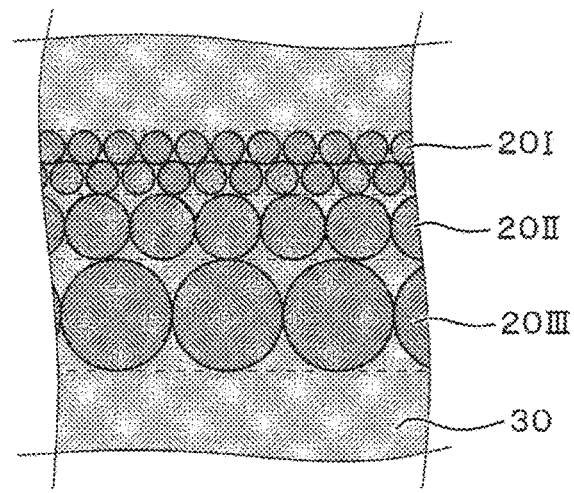
FIG. 6 is a sectional view schematically showing a different particle size layer in which the particle sizes of the active material particles are gradually different in the laminating direction in a solid battery according to an embodiment of the present invention.

In one preferred aspect, in the different particle size layers, the average particle size of each active material particle of the plurality of sub-active material layers is gradually different in the laminating direction. In the exemplary aspect shown in FIG. 6, a different particle size layer includes three sub-active material layers having different average particle sizes. In the laminating direction of the different particle size layer, a sub-active material layer including active material particles 20I having a relatively small average particle size, a sub-active material layer including active material particles 20II having a relatively medium particle size, and sub-active material layers including active material particles 20III having a relatively large average particle size are provided in this order. Based on the exemplary aspect shown in FIG. 3, such different particle size layers may be negative electrode layers $50_1$ and $50_3$, etc., in which a different electrode layer is present only on one opposite side. In this case, it is preferable that the sub-active material layers including the active material particles 20I having a relatively small average particle size in the negative electrode layers $50_1$ and $50_3$ are provided on the positive electrode layers $40_1$ and $40_2$ sides facing each other in the laminating direction, respectively.

Figure 7:
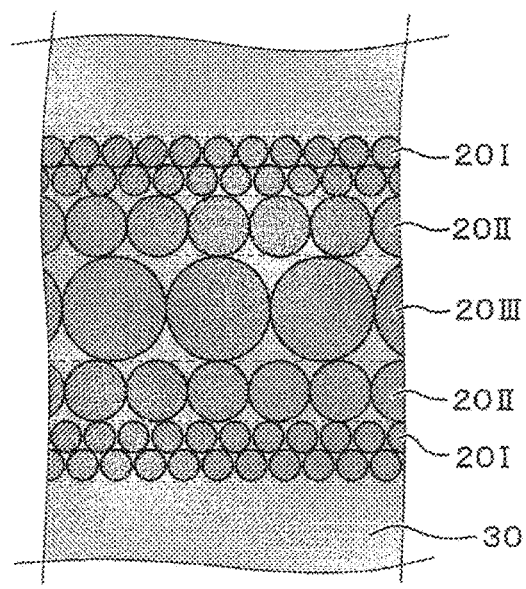
FIG. 7 is a sectional view schematically showing a different particle size layer in which a plurality of sub-active material layers having a large particle size is interposed between sub-active material layers having a small particle size in a solid battery according to an embodiment of the present invention.

In another preferred aspect, in the different particle size layer, the sub-active material layer including a plurality of active material particles having a relatively large average particle size is interposed between the sub-active material layers including active material particles with a relatively small average particle size, so that their active material particle sizes are gradually different in the laminating direction. In the exemplary aspect shown in FIG. 7, a different particle size layer includes the following three kinds of sub-active material layers: a first sub-active material layer including active material particles 20I having a relatively small average particle size; a second sub-active material layer including active material particles 20II having a relatively medium particle size; and a third sub-active material layer including active material particles 20III having a relatively large average particle size. In the laminating direction of the different particle size layer, the first sub-active material layer, the second sub-active material layer, the third sub-active material layer, the second sub-active material layer and the first sub-active material layer are provided in this order. Based on the exemplary aspect shown in FIG. 3, such different particle size layer may be positive electrode layers $40_1$ and $40_2$, negative electrode layer $50_2$, etc., in which different electrode layers are present on both opposite sides thereof.

As described above, in the different particle size layer, the average particle size of each active material particle of the plurality of sub-active material layers is gradually different in the laminating direction, so that the difference in the substantial ion diffusion distance from the surface layer to the inner layer of the electrode layer can be reduced. Therefore, the ionic conduction in the laminating direction of the electrode layer can be more uniform, and the balance of the charge/discharge reaction in the laminating direction of the electrode layer can be improved more effectively.

In one preferred aspect, a plurality of sub-active material layers includes active material particles of the same species as each other. When the active material particles in the plurality of sub-active material layers are of the same species, the reaction rate on the surface of each active material particle can be the same. That is, the ion diffusion distance in the laminating direction can be adjusted only by the average particle size of the active material particles, and the balance of the charge/discharge reaction in the laminating direction of the electrode layer can be improved more effectively.

In one preferred aspect, the active material particles in the negative electrode layer are particles containing a carbon material. Since the active material particles of the negative electrode layer contain the carbon material, an ion (particularly a lithium ion) can be more preferably supported in the material. Furthermore, since the carbon material has good electron conductivity, it is possible to form a structure in which the negative electrode layer does not have a current collector layer (that is, a current collector-less structure). When the negative electrode layer has a current collector-less structure, the volume ratio of the negative electrode active material particles can be increased, and the energy density of the solid battery can be improved.

In one preferred aspect, a positive electrode sub-active material layer and a positive electrode current collector layer are laminated in the laminating direction of the positive electrode layer. For example, the positive electrode current collector layer is interposed between two positive electrode sub-active material layers. With such a structure, the positive electrode layer can have high electron conductivity if a material having low electron conductivity is used as the positive electrode active material.

Figure 8:
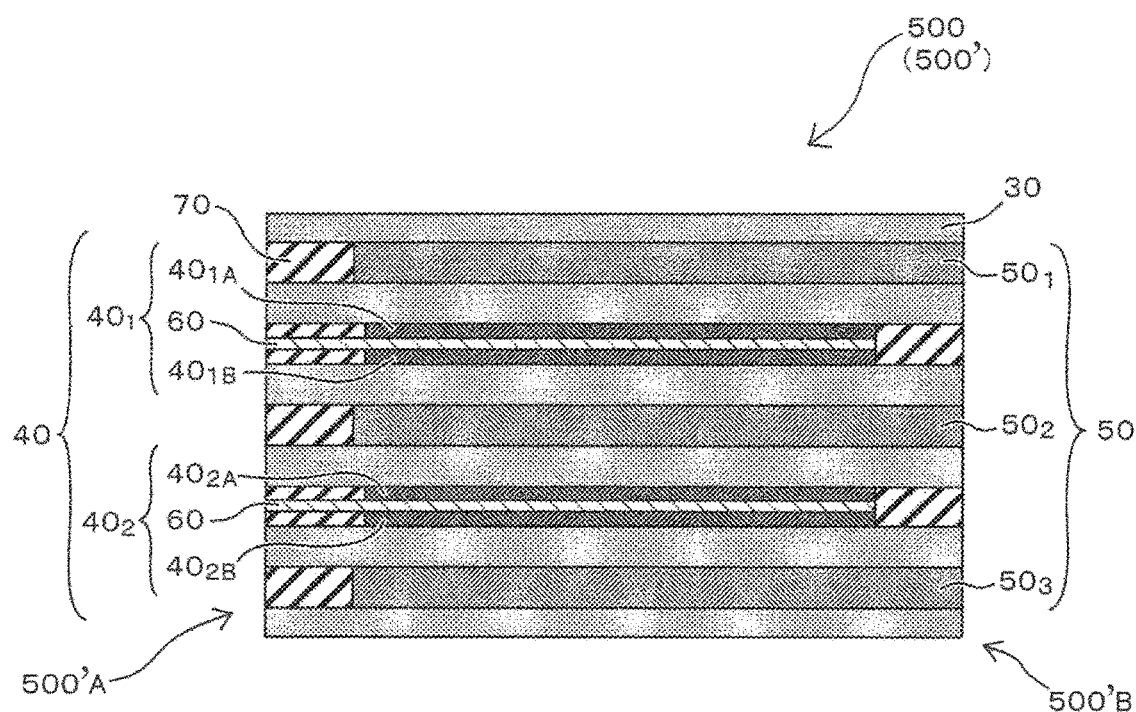
FIG. 8 is a sectional view schematically showing a solid battery according to an embodiment of the present invention.

In a more preferred aspect, the active material particles of the negative electrode layer contain a carbon material, and the positive electrode sub-active material layer and the positive electrode current collector layer are laminated in the laminating direction of the positive electrode layer (FIG. 8).

In one preferred aspect, in the different particle size layer, the sub-active material layer including the active material particles having the relatively smallest average particle size has an average particle size ratio of 0.05 to 0.7 with respect to the sub-active material layer including active material particles having a relatively largest average particle size. In the exemplary aspect shown in FIG. 6, the "minimum average particle size" of the active material particles means the average particle size of the sub-active material layer including the active material particles 20I, and the "maximum average particle size" means the average particle size of the sub-active material layer including the active material particles 20III.

When the average particle size ratio as described above is 0.05 or more, isolation of active material particles having a relatively small average particle size can be particularly prevented, and the energy density of the solid battery can be further improved. Furthermore, when the average particle size ratio is 0.7 or less, the number of ions diffused through the interparticle gaps of the active material particles can be increased more effectively. Furthermore, when the average particle size ratio is in the range of 0.05 to 0.7, a more suitable difference in ion diffusion distance can be obtained according to the reaction rate in each sub-active material layer, and the balance of charge/discharge reactions in the laminating direction of the electrode layer can be further improved.

In the present description, the different particle size layer including a plurality of sub-active material layers having different average particle sizes of the active material particles from each other can be determined from an electron microscope image. For example, the structure of such a different particle size layer can be grasped from an image obtained by cutting out a section of the solid battery in the sectional view direction by an ion milling device (manufactured by Hitachi High-Tech Corporation, model number IM4000PLUS) and using a scanning electron microscope (SEM) (manufactured by Hitachi High-Tech Corporation, model number SU-8040). Furthermore, the average particle size ratio of the active material particles as used in the present description may refer to a value calculated from the dimension measured from the image obtained by the above method.

The average particle size of the active material particles can be obtained, for example, as follows. First, a scanning electron microscope (SEM) is used to take a sectional image of a different particle size layer including sub-active material layers having different average particle sizes of the active material particles from each other. Next, 10 active material particles are randomly selected from each sub-active material layer for one image taken, and the maximum diameter length of each of the particles (maximum diameter length on the surface observed in the SEM image) is determined as the particle size. The above processing for determining the particle size is performed on 10 images in each sub-active material layer, and the average particle size is determined by arithmetically averaging the obtained particle sizes of the respective active material particles in each of the sub-active material layers. Furthermore, in the average particle size of each of the obtained sub-active material layers, the minimum average particle size is divided by the maximum average particle size to obtain the average particle size ratio of the minimum average particle size with respect to the maximum average particle size of the active material particles between the plurality of sub-active material layers.

The solid battery according to the present invention is a laminated solid battery in which each layer constituting the battery constituent unit is laminated and is manufactured by a printing method such as a screen-printing method, a green sheet method using a green sheet, or a composite method thereof. Therefore, each layer constituting the battery constituent unit is composed of a sintered body. Preferably, the positive electrode layer, the negative electrode layer, and the solid electrolyte are integrally sintered with each other. That is, it can be said that the solid battery laminate is a fired integrated product. In such a fired integrated product, at least one of the positive electrode layer and the negative electrode layer is a different particle size layer including a plurality of sub-active material layers having different average particle sizes of the active material particles from each other.

A more preferred aspect of the solid battery will be described. Taking the aspect shown in FIG. 8 as an example, in a sectional view of the solid battery 500, a positive electrode layer 40 (that is, positive electrode layers $40_1$ and $40_2$), a negative electrode layer 50 (that is, negative electrode layers $50_1$, $50_2$, and $50_3$), and a solid electrolyte layer 30 around the positive electrode layer 40 and the negative electrode layer 50 are provided. The positive electrode layer $40_1$ has a structure in which the current collector layer 60 is interposed between the positive electrode active material layers $40_{1A}$ and $40_{1B}$, and the positive electrode layer $40_2$ also has a similar structure. Furthermore, since the negative electrode layer 50 contains a carbon material as active material particles, it has a current collector-less structure that does not include a current collector layer.

The positive electrode layer 40 and the negative electrode layer 50 extend so as to be terminated at the positive electrode side end face 500'A and the negative electrode side end face 500'B, respectively. Only the current collector layer 60 extends in the part of the positive electrode layer 40 that terminates at the positive electrode side end face 500'A, and an electrode separation part 70 is provided around the periphery thereof. The positive electrode layer 40 is formed so as not to be terminated at the negative electrode side end face 500'B, and the negative electrode layer 50 is formed so as not to be terminated at the positive electrode side end face 500'A. The electrode separation parts 70 may be provided between the positive electrode layer 40 and the negative electrode side end face 500'B, and between the negative electrode layer 50 and the positive electrode side end face 500'A, respectively.

Each of the positive electrode layers $40_1$ and $40_2$ and the negative electrode layers $50_1$, $50_2$, and $50_3$ may be a different particle size layer including a plurality of sub-active material layers having different average particle sizes of the active material particles from each other. Each of the positive electrode active material layers $40_{1A}$, $40_{1B}$, $40_{2A}$, and $40_{2B}$, and the negative electrode layers $50_1$ and $50_3$ has two sub-active material layers having different average particle sizes as shown in FIG. 4, respectively. Here, the sub-active material layers including the active material particles 20I having a relatively small average particle size in the positive electrode active material layers $40_{1A}$, $40_{1B}$, $40_{2A}$, and $40_{2B}$ are provided on the negative electrode layer 50 side facing each other in the laminating direction (that is, in such a positive electrode active material layer, the sub-active material layer including active material particles having a relatively small average particle size is disposed relatively proximal to the directly opposed negative electrode layer). Furthermore, the sub-active material layers including the active material particles 20I having a relatively small average particle size in the negative electrode layers $50_1$ and $50_3$ are provided on the positive electrode layer 40 side facing each other in the laminating direction (that is, in such a negative electrode active material layer, the sub-active material layer including the active material particles having a relatively small average particle size is disposed relatively proximal to the directly opposed positive electrode layer).

The negative electrode layer $50_2$ includes three sub-active material layers as shown in FIG. 5 and has a structure in which a sub-active material layer including the active material particles 20II having a relatively large average particle size interposed between two sub-active material layers including active material particles 20I with a relatively small average particle size in the laminating direction.

Figure 9A:
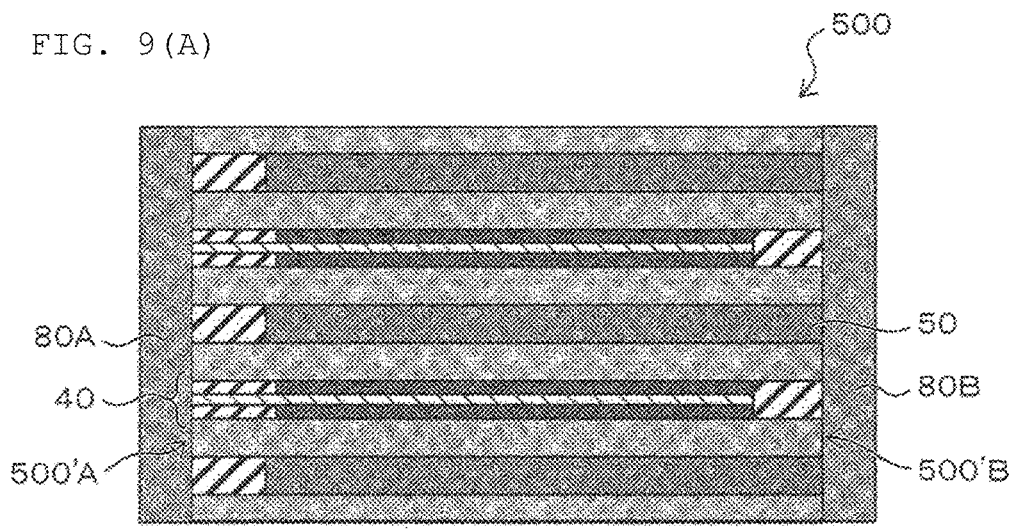
FIG. 9A and FIG. 9B are sectional views schematically showing a solid battery according to an embodiment of the present invention.

The solid battery may further include a terminal. As shown in FIG. 9A, the solid battery 500 may include a positive electrode terminal 80A electrically connected to the positive electrode layer 40 at the positive electrode side end face 500'A and a negative electrode terminal 80B electrically connected to the negative electrode layer 50 at the negative electrode side end face 500'B.

Figure 9B:
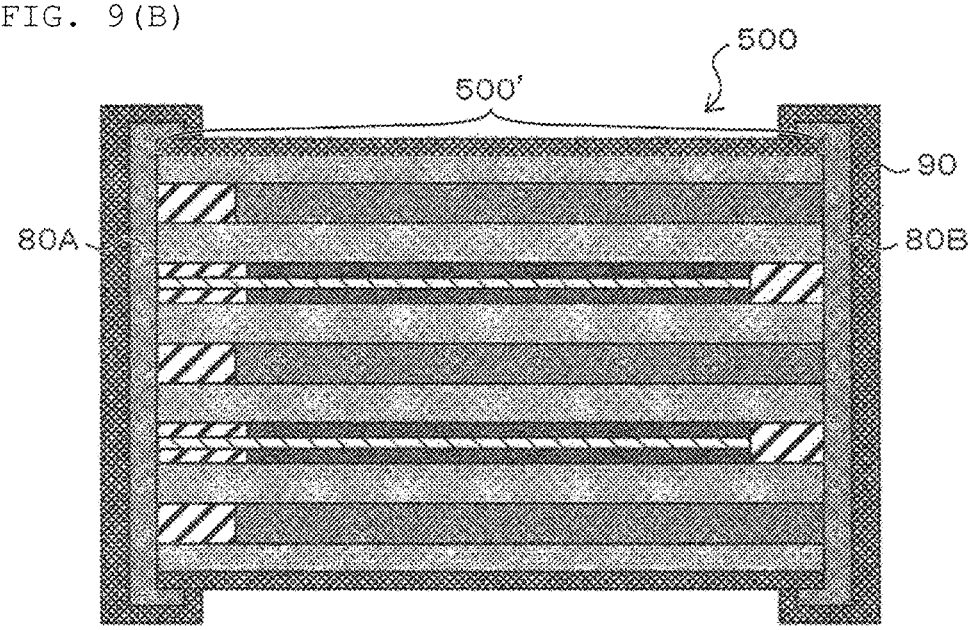

The solid battery may further include a protective layer. As shown in FIG. 9B, the solid battery 500 may include a protective layer 90 on the outside of the solid battery laminate 500', the positive electrode terminal 80A, and the negative electrode terminal 80B so as to be integrated with them.

[Method for Manufacturing Solid Battery]

As described above, the solid battery of the present invention can be manufactured by a printing method such as a screen-printing method, a green sheet method using a green sheet, or a composite method thereof. Hereinafter, the case where the printing method and the green sheet method are adopted for understanding the present invention is described in detail, but the present invention is not limited to the methods.

(Step of Forming Solid Battery Laminated Precursor)

In the step, several kinds of pastes such as a positive electrode layer paste, a negative electrode layer paste, a solid electrolyte layer paste, a current collector layer paste, an electrode separation part paste, and a protective layer paste are used as ink. That is, a paste having a predetermined structure is formed on a substrate as a support substrate by applying the paste using the printing method.

At the time of printing, a solid battery laminated precursor corresponding to a predetermined solid battery structure can be formed on the substrate by sequentially laminating the printing layers having a predetermined thickness and pattern shape. The kind of the pattern forming method is not particularly limited as long as it is a method capable of forming a predetermined pattern, and is, for example, any one kind or two or more kinds of a screen-printing method and a gravure printing method.

The paste can be prepared by wet blending a predetermined constituent material of each layer appropriately selected from the group consisting of positive electrode active material particles, negative electrode active material particles, an electron conductive material, a solid electrolyte material, a current collector layer material, an insulating material, a binder, and a sintering aid with an organic vehicle in which an organic material is dissolved in a solvent. The positive electrode layer paste contains, for example, the positive electrode active material particles, the electron conductive material, the solid electrolyte material, the binder, the sintering aid, the organic material, and the solvent. The negative electrode layer paste contains, for example, the negative electrode active material particles, the electron conductive material, the solid electrolyte material, the binder, the sintering aid, the organic material and the solvent. The solid electrolyte layer paste contains, for example, the solid electrolyte material, the binder, the sintering aid, the organic material, and the solvent. The positive electrode current collector layer paste and the negative electrode current collector layer paste contain, for example, the electron conductive material, the binder, the sintering aid, the organic material, and the solvent, respectively. The electrode separation part paste contains, for example, the solid electrolyte material, the insulating material, the binder, the sintering aid, the organic material, and the solvent. The protective layer paste contains, for example, the insulating material, the binder, the organic material, and the solvent. The insulating layer paste contains, for example, the insulating material, the binder, the organic material, and the solvent.

The organic material contained in the paste is not particularly limited, but at least one kind of the polymer material selected from the group consisting of a polyvinyl acetal resin, a cellulose resin, a polyacrylic resin, a polyurethane resin, a polyvinyl acetate resin, a polyvinyl alcohol resin, and the like can be used. The kind of the solvent is not particularly limited, and includes, for example, any one kind or two or more kinds of organic solvents such as butyl acetate, toluene, terpineol, and N-methyl-pyrrolidone.

In the wet blending, a medium can be used, and specifically, a ball mill method, a bead mill method, or the like can be used. On the other hand, a wet blending method that does not use the media may be used, and a sand mill method, a high-pressure homogenizer method, a kneader dispersion method, or the like can be used.

The support substrate is not particularly limited as long as it is a support capable of supporting each paste layer, and examples thereof include a release film with release treatment on one surface. Specifically, a substrate composed of a polymer material such as polyethylene terephthalate can be used. When each paste layer is subjected to a firing step while being held on the substrate, a substrate that exhibits heat resistance to the firing temperature may be used.

The applied paste is dried on a hot plate heated to 30° C. or higher and 50° C. or lower to form a positive electrode layer green sheet, a negative electrode layer green sheet, a solid electrolyte green sheet, an insulating layer green sheet and/or a protective layer green sheet having a predetermined shape and thickness, etc. on the substrate (for example, PET film), respectively.

Next, each green sheet is peeled off from the substrate. After peeling, the green sheets of each component of one battery constituent unit are sequentially laminated along the laminating direction to form a solid battery laminated precursor. After laminating, a solid electrolyte layer, an insulating layer and/or a protective layer and the like may be provided on the side region of the electrode green sheet by screen printing.

(Firing Step)

In the firing step, the solid battery laminated precursor is subjected to firing. Although it is merely an example, firing is performed in a nitrogen gas atmosphere containing oxygen gas or in the atmosphere, for example, after removing the organic material at 500° C., by heating in a nitrogen gas atmosphere or in the atmosphere, for example, at 550° C. or higher and 5000° C. or lower. The firing may be performed while pressurizing the solid battery laminated precursor in the laminating direction (in some cases, the laminating direction and the direction perpendicular to the laminating direction).

Such firing is performed to form a solid battery laminate, and finally a desired solid battery is obtained.

(Regarding Preparation of Characteristic Part in Present Invention)

The different particle size layer in the solid battery of the present invention may be formed by any method as long as a plurality of sub-active material layers having different average particle sizes form a laminated structure in the layer. For example, the average particle size of the active material particles may be changed from the stage of the raw material paste. That is, a plurality of raw material pastes may be prepared so that each active material particle having a different average particle size forms a laminated structure as a plurality of sub-active material layers. That is, a raw material paste may be prepared for each active material particle having a different average particle size.

Furthermore, for example, as a green sheet, the average particle size of the active material particles contained therein may be changed. That is, the printing layers of the raw material pastes containing the active material particles having different average particle sizes may be sequentially laminated with a predetermined thickness and pattern shape to prepare an electrode layer green sheet corresponding to the predetermined structure. Specifically, the active material particle size and/or the number of times of application of the raw material paste in each printing layer to be laminated may be adjusted to prepare the electrode layer green sheet so as to include a plurality of predetermined sub-active material layers having different particle sizes.

Figure 10A:
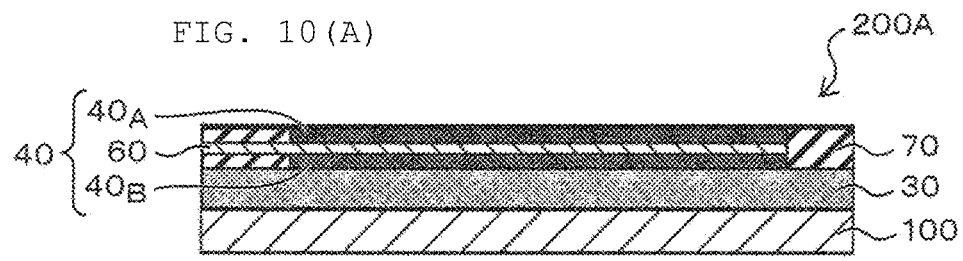
FIG. 10A to FIG. 10C are sectional views schematically for explaining a method for manufacturing a solid battery according to an embodiment of the present invention.

Hereinafter, a method for manufacturing a solid battery is described in more detail based on the exemplary aspects shown in FIGS. 10A to 10C.

In order to manufacture a solid battery, for example, as described below, a step of forming a positive electrode green sheet 200A, a step of forming a negative electrode green sheet 200B, a step of forming the solid battery laminate 500', and a step of forming each of a positive electrode terminal 80A and a negative electrode terminal 80B are performed.

[Step for Forming Positive Electrode Green Sheet]

A solid electrolyte layer paste is prepared by mixing the solid electrolyte, the solvent, and if necessary, an electrolyte binder, etc. Subsequently, as shown in FIG. 10A, the solid electrolyte layer paste is applied to one surface of a substrate 100 to form the solid electrolyte layer 30.

An electrode separation part paste is prepared by mixing the insulating material, the solvent, and if necessary, an electrode separation binder, etc. Subsequently, the electrode separation part paste is applied to the end of the surface of the solid electrolyte layer 30 using the pattern forming method to form two electrode separation parts 70.

A positive electrode paste is prepared by mixing a positive electrode active material, a solvent, and if necessary, a positive electrode active material particle binder, etc. For the positive electrode paste, two kinds of the pastes are prepared using two positive electrode active material particles having different particle sizes.

The two kinds of positive electrode pastes are applied to the surface of the solid electrolyte layer 30 using a pattern forming method. At this time, first, the positive electrode paste of the positive electrode active material particles having a relatively small particle size is applied, and then the positive electrode paste of the positive electrode active material particles having a relatively large particle size is applied on the applied paste to form the positive electrode sub-active material layer $40_B$.

A positive electrode current collector paste is prepared by mixing a conductive material, a solvent, and if necessary, a positive electrode current collector binder, etc. Subsequently, the positive electrode current collecting paste is applied to the surfaces of the positive electrode sub-active material layer $40_B$ and the electrode separation part 70 using the pattern forming method to form a positive electrode current collector layer 60.

Finally, the positive electrode paste and the electrode separation part paste are applied to the surface of the positive electrode current collector layer 60 to form a positive electrode sub-active material layer $40_A$ and the electrode separation part 70. At this time, first, a positive electrode paste of positive electrode active material particles having a relatively large particle size is applied, and then a positive electrode paste of positive electrode active material particles having a relatively small particle size is applied on the applied paste to form the positive electrode sub-active material layer $40_A$. As a result, since the two positive electrode sub-active material layers $40_A$ and $40_B$ are laminated on each other with the positive electrode current collector layer 60 interposed between them, the positive electrode layer 40 is formed. Therefore, since the positive electrode layer 40 and the electrode separation part 70 are formed so as to be disposed in the same layer, the positive electrode green sheet 200A including the positive electrode layer 40, the solid electrolyte layer 30, and the electrode separation part 70 can be obtained.

[Step for Forming Negative Electrode Green Sheet]

Figure 10B:
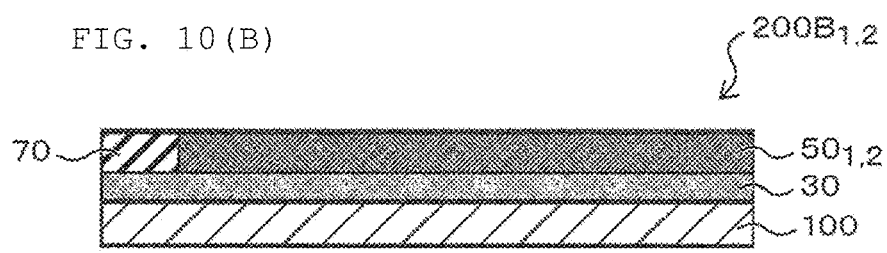
Figure 10C:
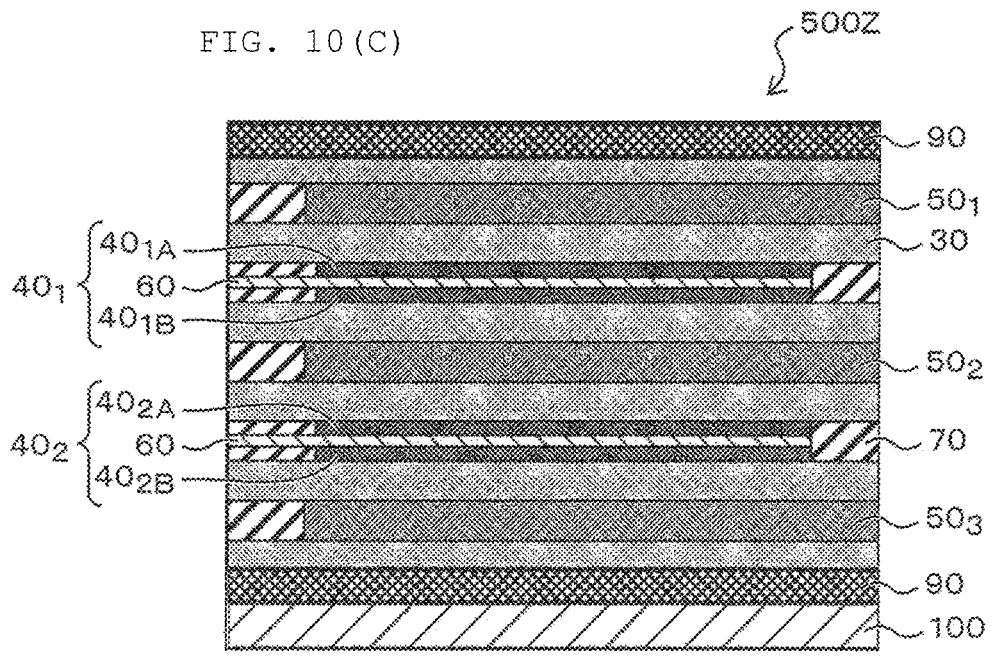

As shown in FIG. 10B, the solid electrolyte layer 30 is formed on one surface of the substrate 100 by the above procedure.

The electrode separation part paste is prepared by the same procedure as the above procedure for preparing the electrode separation part paste. Subsequently, the electrode separation part paste is applied to the surface of the solid electrolyte layer 30 to form the electrode separation part 70 using the pattern forming method.

A negative electrode paste is prepared by mixing the negative electrode active material particles, a solvent, and if necessary, a negative electrode binder, etc. For the negative electrode paste, two kinds of pastes are prepared using two negative electrode active material particles having different particle sizes.

The two kinds of negative electrode pastes are applied to the surface of the solid electrolyte layer 30 using a pattern forming method. At this time, first, a negative electrode paste of negative electrode active material particles having a relatively small particle size is applied, and then a negative electrode paste of negative electrode active material particles having a relatively large particle size is applied on the applied paste to form the negative electrode layer $50_1$. Therefore, since the negative electrode layer $50_1$ and the electrode separation part 70 are formed so as to be disposed in the same layer, a negative electrode green sheet $200B_1$ including the negative electrode layer $50_1$, the solid electrolyte layer 30, and the electrode separation part 70 can be obtained.

Similarly, two kinds of negative electrode pastes are applied to the surface of the solid electrolyte layer 30 using the pattern forming method. At this time, first, the negative electrode paste of the negative electrode active material particles having a relatively small particle size is applied, the negative electrode paste of the negative electrode active material particles having a relatively large particle size is applied on the applied paste, and then the negative electrode paste of the negative electrode active material particles having a relatively small particle size is further applied on the applied pastes to form a negative electrode layer $50_2$. Therefore, since the negative electrode layer $50_2$ and the electrode separation part 70 are formed so as to be disposed in the same layer, a negative electrode green sheet $200B_2$ including the negative electrode layer $50_2$, the solid electrolyte layer 30, and the electrode separation part 70 can be obtained.

[Step for Forming Solid Battery Laminate]

A protective paste is prepared by mixing the protective solid electrolyte, the solvent, and if necessary, a protective binder, etc. Alternatively, the protective paste is prepared by mixing the protective solid electrolyte, the solvent, the insulating material, and if necessary, the protective binder, etc. Subsequently, as shown in FIG. 10C, the protective paste is applied to one surface of the substrate 100 to form the protective layer 90.

The solid electrolyte layer paste is applied to the surface of the protective layer 90 to form the solid electrolyte layer 30. Subsequently, the electrode separation part paste is applied to the surface of the solid electrolyte layer 30 to form the electrode separation part 70 using the pattern forming method.

The two kinds of negative electrode pastes are applied to the surface of the solid electrolyte layer 30 using a pattern forming method. At this time, first, a negative electrode paste of negative electrode active material particles having a relatively large particle size is applied, and then a negative electrode paste of negative electrode active material particles having a relatively small particle size is applied on the surface to form the negative electrode layer $50_3$. As a result, the negative electrode layer $50_3$ and the electrode separation part 70 are formed so as to be disposed in the same layer.

The green sheets 200A, $200B_2$, 200A, and $200B_1$ peeled from the substrate 100 are laminated in this order on the negative electrode layer $50_3$ and the electrode separation part 70.

The solid electrolyte layer 30 is formed on the negative electrode layer $50_1$ and the electrode separation part 70 by the same procedure as the procedure for forming the solid electrolyte layer 30, and then the protective layer 90 is formed on the solid electrolyte layer 30 by the same procedure as the procedure for forming the protective layer 90. Next, a solid battery laminated precursor 500Z is formed by peeling off the substrate 100 which is the lowest layer. As a result, the solid battery laminated precursor 500Z is obtained.

Finally, the solid battery laminated precursor 500Z is heated. In this case, the heating temperature is set so that a series of layers constituting the solid battery laminated precursor 500Z are sintered. Other conditions such as heating time can be set optionally.

The series of layers constituting the solid battery laminated precursor 500Z are sintered by the heat treatment, and the series of layers are thermocompressed. Therefore, the solid battery laminate 500' is formed.

[Step for Forming Each of Positive Electrode Terminal and Negative Electrode Terminal]

For example, a conductive adhesive is used to bond the positive electrode terminal to the solid laminate, and for example, a conductive adhesive is used to bond the negative electrode terminal to the solid laminate. As a result, each of the positive electrode terminal and the negative electrode terminal is attached to the solid laminate, so that the solid battery is completed.

Although the embodiments of the present invention have been described above, they merely exemplify typical examples. Therefore, a person skilled in the art will easily understand that the present invention is not limited to this, and various aspects can be considered without changing the gist of the present invention.

For example, in the above description, for example, the solid battery exemplified in FIG. 8 has been mainly described, but the present invention is not necessarily limited to it. In the present invention, any solid battery in which the positive electrode layer, the negative electrode layer, and the solid electrolyte layer are included, and at least one of the positive electrode layer and the negative electrode layer is a different particle size layer including a plurality of sub-active material layers having different average particle sizes of the active material particles from each other can be similarly applied.

The solid battery of the present invention can be used in various fields where storage is expected. The solid battery of the present invention can be used in fields of electricity/information/communication in which a mobile device is used (for example, the field of mobile devices such as a mobile phone, a smartphone, a notebook computer, a digital camera, an activity meter, an arm computer, and electronic paper), home/small industrial uses (for example, in the fields of a power tool, a golf cart, and home/nursing/industrial robots), large industrial uses (for example, a forklift, an elevator, and a gantry crane), a field of transportation system (for example, a hybrid vehicle, an electric vehicle, a bus, a train, an electrically power assisted bicycle, and an electric motorcycle), a power system use (for example, various fields of power generation, a road conditioner, a smart grid, and a general household power storage system), a medical use (medical equipment fields such as an earphone hearing aid), a pharmaceutical use (fields such as dose management systems), and an IoT field, space/deep sea uses (for example, a space probe, and a submarine research ship), and these are just examples.

DESCRIPTION OF REFERENCE SYMBOLS

10: Ions
10': Precipitates
20: Active material particles
30: Solid electrolyte layer
40: Positive electrode layer
$40_1$: First positive electrode layer
$40_{1-4}$: Positive electrode sub-active material layer in first positive electrode layer
$40_2$: Second positive electrode layer
$40_{2-4}$: Positive electrode sub-active material layer in second positive electrode layer
50: Negative electrode layer
$50_1$: First negative electrode layer
$50_2$: Second negative electrode layer
$50_3$: Third negative electrode layer
60: Positive electrode current collector layer
70: Electrode separation part
80: Terminals
80A: Positive electrode terminal
80B: Negative electrode terminal
90: Protective layer
100: Substrate
200: Green sheet
200A: Positive electrode green sheet
200B: Negative electrode green sheet
500Z: Solid battery laminated precursor
500': Solid battery laminate
500'A: Positive electrode side end face
500'B: Negative electrode side end face
500: Solid battery

The invention claimed is:

1. A solid battery comprising:
a plurality of battery constituent units, each battery constituent unit of the plurality of battery constituent units including a positive electrode layer, a negative electrode layer, and a solid electrolyte layer interposed between the positive electrode layer and the negative electrode layer along a laminating direction thereof,
wherein at least one electrode layer in which different electrode layers are present on opposite sides thereof in the laminating direction among the positive electrode layers and the negative electrode layers of the plurality of battery constituent units includes a plurality of sub-active material layers,
wherein, in the laminating direction, the plurality of sub-active material layers include a first sub-active material layer including active material particles having a first average particle size interposed between a second and a third sub-active material layer which each include active material particles having a second average particle size, the first average particle size being larger than the second average particle size,
wherein the second and the third sub-active material layer are directly adjacent to the solid electrolyte layer in the laminating direction, and
wherein a particle size of the plurality of sub-active material layers increases toward a center of the at least one electrode layer from opposed sides thereof in the laminating direction, wherein at least one outermost electrode layer in the laminating direction does not include the plurality of sub-active material layers including the first sub-active material layer including active material particles having the first average particle size interposed between the second and the third sub-active material layer which each include active material particles having the second average particle size.

2. The solid battery according to claim 1, wherein the plurality of sub-active material layers includes active material particles of a same species as each other.

3. The solid battery according to claim 1, wherein the at least one electrode layer is the negative electrode layer, and the active material particles contain a carbon material.

4. The solid battery according to claim 1, wherein the active material particles of the second and third sub-active material layers have an average particle size ratio of 0.05 to 0.7 with respect to an average particle size of the active material particles of the first sub-active material layer.

5. The solid battery according to claim 1, wherein the positive electrode layer and the negative electrode layer are layers constructed to occlude and release a lithium ion.

6. The solid battery according to claim 1, wherein both the negative electrode layer and the positive electrode layer include the plurality of sub-active material layers.

7. The solid battery according to claim 6, wherein the active material particles in the negative electrode layer contain a carbon material.

8. The solid battery according to claim 6, wherein the plurality of sub-active material layers in each of the negative electrode layer and the positive electrode layer includes active material particles of a same species as each other, respectively.

9. The solid battery according to claim 6, wherein the active material particles of the second and third sub-active material layers in each of the negative electrode layer and the positive electrode layer have an average particle size ratio of 0.05 to 0.7 with respect to an average particle size of the active material particles of the first sub-active material layer.

10. The solid battery according to claim 6, wherein the positive electrode layer and the negative electrode layer are layers constructed to occlude and release a lithium ion.

* * * * *